US008978981B2

(12) United States Patent
Guan

(10) Patent No.: US 8,978,981 B2
(45) Date of Patent: Mar. 17, 2015

(54) IMAGING APPARATUS HAVING IMAGING LENS

(75) Inventor: Yiyi Guan, Camillus, NY (US)

(73) Assignee: Honeywell International Inc., Fort Mill, SC (US)

( * ) Notice: Subject to any disclaimer, the term of this patent is extended or adjusted under 35 U.S.C. 154(b) by 314 days.

(21) Appl. No.: 13/534,959

(22) Filed: Jun. 27, 2012

(65) Prior Publication Data

US 2014/0002699 A1 Jan. 2, 2014

(51) Int. Cl.

| | |
|---|---|
| ***G06K 7/10*** | (2006.01) |
| ***G02B 9/04*** | (2006.01) |
| ***G02B 13/16*** | (2006.01) |
| ***G02B 13/18*** | (2006.01) |
| ***H04N 5/225*** | (2006.01) |
| ***H04N 5/235*** | (2006.01) |
| ***H04N 9/04*** | (2006.01) |

(52) U.S. Cl.

CPC *G02B 9/04* (2013.01); *G02B 13/16* (2013.01); *G02B 13/18* (2013.01); *H04N 5/2256* (2013.01); *H04N 5/2354* (2013.01); *H04N 9/045* (2013.01)

USPC .............. 235/462.11; 235/462.1; 235/462.13; 235/462.04

(58) Field of Classification Search

USPC ................ 235/462.1, 462.04, 462.13, 462.11

See application file for complete search history.

(56) References Cited

U.S. PATENT DOCUMENTS

| | | | |
|---|---|---|---|
| 4,843,222 | A | 6/1989 | Hochgraf |
| 5,019,699 | A | 5/1991 | Koenck |
| 5,037,201 | A | 8/1991 | Smith, III et al. |
| 5,119,939 | A | 6/1992 | Teeter et al. |
| 5,173,599 | A | 12/1992 | Setani |
| 5,175,426 | A | 12/1992 | Chuan-Yu |
| 5,406,062 | A | 4/1995 | Hasegawa et al. |
| 5,468,950 | A | 11/1995 | Hanson |
| 5,504,367 | A | 4/1996 | Arackellian et al. |
| 5,541,419 | A | 7/1996 | Arackellian |
| 5,572,006 | A | 11/1996 | Wang et al. |
| 5,576,529 | A | 11/1996 | Koenck et al. |
| 5,591,955 | A | 1/1997 | Laser |
| 5,616,907 | A | 4/1997 | Hasegawa et al. |
| 5,623,137 | A | 4/1997 | Powers et al. |
| 5,627,359 | A | 5/1997 | Amundsen et al. |
| 5,646,390 | A | 7/1997 | Wang et al. |
| 5,648,650 | A | 7/1997 | Sugifune et al. |
| 5,701,001 | A | 12/1997 | Sugifune et al. |
| 5,701,175 | A | 12/1997 | Kostizak et al. |
| 5,702,059 | A | 12/1997 | Chu et al. |
| 5,714,745 | A | 2/1998 | Ju et al. |
| 5,745,176 | A | 4/1998 | Lebens |
| 5,756,981 | A | 5/1998 | Roustaei et al. |
| 5,763,864 | A | 6/1998 | O'Hagan et al. |
| 5,783,811 | A | 7/1998 | Feng et al. |
| 5,784,102 | A | 7/1998 | Hussey et al. |

(Continued)

*Primary Examiner* — Karl D Frech

(74) *Attorney, Agent, or Firm* — Additon, Higgins & Pendleton, P.A.

(57) ABSTRACT

There is set forth herein in one embodiment an imaging apparatus having an imaging assembly and an illumination assembly. The imaging assembly can comprise an imaging lens and an image sensor array. The illumination assembly can include a light source bank having one or more light source. The imaging assembly can define a field of view on a substrate and the illumination assembly can project light within the field of view. The imaging apparatus can be configured so that the illumination assembly during an exposure period of the imaging assembly emits light that spans multiple visible color wavelength bands.

20 Claims, 10 Drawing Sheets

(56) References Cited

U.S. PATENT DOCUMENTS 5,789,731 A 8/1998 Amundsen et al.
5,793,033 A 8/1998 Feng et al.
5,811,774 A 9/1998 Ju et al.
5,811,784 A 9/1998 Tausch et al.
5,811,828 A 9/1998 Laser
5,815,200 A 9/1998 Ju et al.
5,818,028 A 10/1998 Meyerson et al.
5,834,754 A 11/1998 Feng et al.
5,877,487 A 3/1999 Tani et al.
5,886,338 A 3/1999 Arackellian et al.
5,949,057 A 9/1999 Feng
5,969,321 A 10/1999 Danielson et al.
5,969,323 A 10/1999 Gurevich et al.
6,010,070 A 1/2000 Mizuochi et al.
6,029,894 A 2/2000 Amundsen et al.
6,042,013 A 3/2000 Fork
6,123,263 A 9/2000 Feng
6,164,544 A 12/2000 Schwartz et al.
6,179,208 B1 1/2001 Feng
6,209,789 B1 4/2001 Amundsen et al.
6,230,975 B1 5/2001 Colley et al.
6,254,003 B1 7/2001 Pettinelli et al.
6,283,374 B1 9/2001 Fantone et al.
6,330,974 B1 12/2001 Ackley
6,345,765 B1 2/2002 Wiklof
6,347,163 B2 2/2002 Roustaei
6,412,700 B1 7/2002 Blake et al.
6,431,452 B2 8/2002 Feng
6,488,390 B1 12/2002 Lebens et al.
6,601,768 B2 8/2003 McCall et al.
6,669,093 B1 12/2003 Meyerson et al.
6,695,209 B1 2/2004 La
6,749,120 B2 6/2004 Hung et al.
6,808,287 B2 10/2004 Lebens et al.
6,832,725 B2 12/2004 Gardiner et al.
6,877,661 B2 4/2005 Webb et al.
7,061,395 B1 6/2006 Bromer
7,077,321 B2 7/2006 Longacre, Jr. et al.
7,083,097 B2 8/2006 Toyama et al.
7,083,098 B2 8/2006 Joseph et al.
7,100,830 B2 9/2006 Murata et al.
7,185,817 B2 3/2007 Zhu et al.
7,219,843 B2 5/2007 Havens et al.
7,224,540 B2 5/2007 Olmstead et al.
7,234,641 B2 6/2007 Olmstead
7,240,844 B2 7/2007 Zhu et al.
7,255,279 B2 8/2007 Zhu et al.
7,270,274 B2 9/2007 Hennick et al.
7,278,573 B2 10/2007 Murata et al.
7,296,751 B2 11/2007 Barber et al.
7,303,126 B2 12/2007 Patel et al.
7,306,155 B2 12/2007 Hennick et al.
7,308,375 B2 12/2007 Jensen et al.
7,320,431 B2 1/2008 Zhu et al.
7,336,197 B2 2/2008 Ding et al.
7,357,326 B2 4/2008 Hattersley et al.
7,387,250 B2 6/2008 Mani
7,398,927 B2 7/2008 Olmstead et al.
7,478,754 B2 1/2009 Gurevich et al.
7,483,417 B2 1/2009 Farris et al.
7,490,778 B2 2/2009 Zhu et al.
7,500,614 B2 3/2009 Barber et al.
7,503,499 B2 3/2009 Zhu et al.
7,513,430 B2 4/2009 Zhu et al.
7,516,899 B2 4/2009 Laser
7,527,207 B2 5/2009 Acosta et al.
7,533,824 B2 5/2009 Hennick et al.
7,548,274 B2 6/2009 Chaleff et al.
7,557,920 B2 7/2009 Lebens
7,564,548 B2 7/2009 Flanders et al.
7,568,628 B2 8/2009 Wang et al.
7,611,060 B2 11/2009 Wang et al.
7,626,769 B2 12/2009 Olmstead et al.
7,656,556 B2 2/2010 Wang
7,664,097 B2 2/2010 White et al.
7,693,744 B2 4/2010 Forbes
7,712,667 B2 5/2010 Laser
7,735,737 B2 6/2010 Kotlarsky et al.
7,762,464 B2 7/2010 Goren et al.
7,770,799 B2 8/2010 Wang
7,775,436 B2 8/2010 Knowles
7,780,089 B2 8/2010 Wang
7,809,407 B2 10/2010 Oshima et al.
7,810,720 B2 10/2010 Lovett
7,813,047 B2 10/2010 Wang et al.
7,909,257 B2 3/2011 Wang et al.
7,913,912 B2 3/2011 Do et al.
7,918,398 B2 4/2011 Li et al.
7,967,211 B2 6/2011 Challa et al.
7,995,178 B2 8/2011 Suguro et al.
8,074,887 B2 12/2011 Havens et al.
8,479,998 B2 7/2013 Meier et al.
2001/0000615 A1 5/2001 Amundsen et al.
2001/0006150 A1 7/2001 Taniike et al.
2001/0006151 A1 7/2001 Leerkamp et al.
2001/0006152 A1 7/2001 Henderson et al.
2001/0006153 A1 7/2001 Merrell et al.
2001/0006154 A1 7/2001 Krug et al.
2001/0006156 A1 7/2001 Pereira et al.
2001/0006157 A1 7/2001 Ogasawara
2001/0006158 A1 7/2001 Ho et al.
2001/0006159 A1 7/2001 Happ et al.
2001/0027995 A1 10/2001 Patel et al.
2003/0062413 A1 4/2003 Gardiner et al.
2003/0222147 A1 12/2003 Havens et al.
2004/0020990 A1 2/2004 Havens et al.
2004/0164165 A1 8/2004 Havens et al.
2005/0001035 A1 1/2005 Hawley et al.
2005/0023356 A1 2/2005 Wiklof et al.
2005/0103854 A1 5/2005 Zhu et al.
2005/0279836 A1 12/2005 Havens et al.
2006/0011724 A1 1/2006 Joseph et al.
2006/0043194 A1 3/2006 Barkan et al.
2006/0049261 A1 3/2006 Stadtler
2006/0060653 A1 3/2006 Wittenberg et al.
2006/0113386 A1 6/2006 Olmstead
2006/0145057 A1 7/2006 Kim
2006/0163355 A1 7/2006 Olmstead et al.
2006/0171041 A1 8/2006 Olmstead et al.
2006/0202036 A1 9/2006 Wang et al.
2006/0274171 A1 12/2006 Wang
2007/0119949 A1 5/2007 Hattersley et al.
2007/0131775 A1 6/2007 Zhu et al.
2007/0138293 A1 6/2007 Zhu et al.
2007/0181692 A1 8/2007 Barkan et al.
2007/0284447 A1 12/2007 McQueen
2008/0023556 A1 1/2008 Vinogradov et al.
2008/0223933 A1 9/2008 Smith
2008/0252066 A1 10/2008 Rapoport et al.
2008/0277476 A1 11/2008 Kotlarsky et al.
2009/0026267 A1 1/2009 Wang et al.
2009/0057413 A1 3/2009 Vinogradov et al.
2009/0072038 A1 3/2009 Li et al.
2009/0140050 A1 6/2009 Liu et al.
2009/0159686 A1 6/2009 Taylor et al.
2010/0044436 A1 2/2010 Powell et al.
2010/0044440 A1 2/2010 Wang et al.
2010/0078477 A1 4/2010 Wang et al.
2010/0078482 A1 4/2010 Bradford
2010/0097487 A1 4/2010 Marom et al.
2010/0108769 A1 5/2010 Wang et al.
2010/0147956 A1 6/2010 Wang et al.
2010/0155483 A1 6/2010 Craig et al.
2011/0049245 A1 3/2011 Wang
2011/0108708 A1* 5/2011 Olsen et al. ................ 250/208.1
2011/0163165 A1 7/2011 Liu et al.
2011/0174880 A1 7/2011 Li et al.
2012/0000982 A1 1/2012 Gao et al.
2012/0111944 A1 5/2012 Gao et al.

(56) References Cited

U.S. PATENT DOCUMENTS

| | | | |
|---|---|---|---|
| 2012/0138684 | A1 | 6/2012 | Van Volkinburg et al. |
| 2012/0153022 | A1 | 6/2012 | Havens et al. |
| 2012/0193429 | A1 | 8/2012 | Van Volkinburg et al. |
| 2012/0193430 | A1 | 8/2012 | Meier et al. |
| 2012/0325911 | A1 | 12/2012 | Ding et al. |
| 2012/0325912 | A1 | 12/2012 | Wang et al. |

* cited by examiner

IMAGING APPARATUS HAVING IMAGING LENS

FIELD OF THE INVENTION

The present invention relates, in general, to registers and specifically to optical based registers.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. A display and keyboard combination can be provided by a touch screen. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters. In one commercially available indicia reading terminal, a feature for reduction of chromatic aberration includes an aspherical lens. Indicia reading terminals that comprise image sensor arrays can be regarded as imaging apparatus.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

SUMMARY OF THE INVENTION

There is set forth herein in one embodiment an imaging apparatus having an imaging assembly and an illumination assembly. The imaging assembly can comprise an imaging lens and an image sensor array. The illumination assembly can include a light source bank having one or more light source. The imaging assembly can define a field of view on a substrate and the illumination assembly can project light within the field of view. The imaging apparatus can be configured so that the illumination assembly during an exposure period of the imaging assembly emits light that spans multiple visible color wavelength bands.

DETAILED DESCRIPTION OF THE INVENTION

There is set forth herein in one embodiment an imaging apparatus having an imaging assembly and an illumination assembly. The imaging assembly can comprise an imaging lens and an image sensor array. The illumination assembly can include a light source bank having one or more light source. The imaging assembly can define a field of view on a substrate and the illumination assembly can project light within the field of view. The imaging apparatus can be configured so that the illumination assembly during an exposure period of the imaging assembly energizes one or more light source of the illumination assembly so that the illumination assembly emits light that spans multiple visible color wavelength bands (e.g., the blue, green and red wavelength bands).

An exemplary hardware platform for support of operations described herein with reference to an imaging apparatus 1000 as set forth in connection with FIG. 1.

Figure 1:
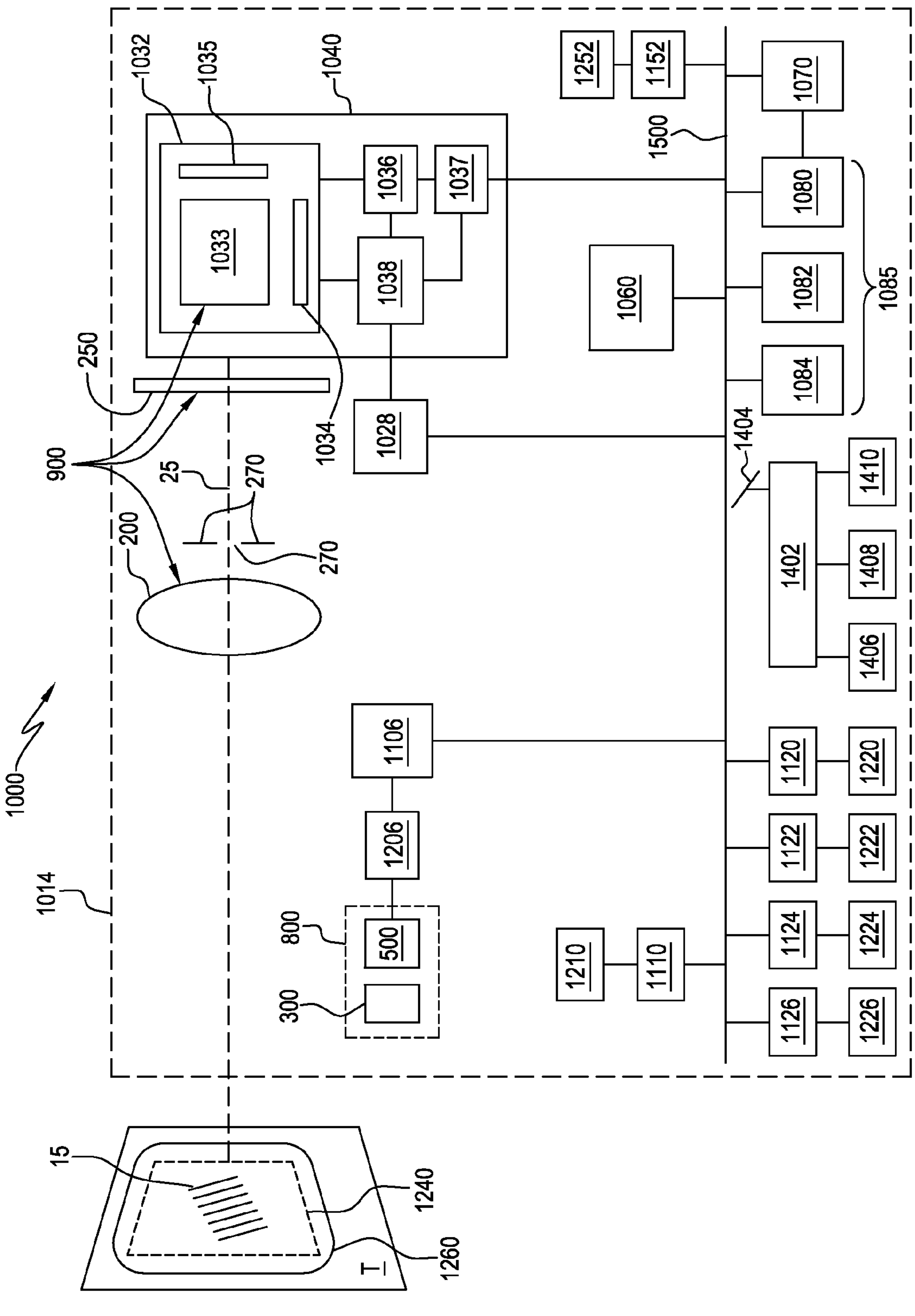
FIG. 1 is a block diagram of an apparatus for use in decoding a bar code symbol, the apparatus having multiple elements supported on a common printed circuit board, in accordance with an aspect of the invention.

Imaging apparatus 1000 can include a housing 1014 indicated by the dashed line of FIG. 1. Apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier or gain circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging assembly of apparatus 1000 can include image sensor 1032 and a lens assembly 200 for focusing an image onto image sensor array 1033 of image sensor 1032. In one example, image sensor array 1003 can be a hybrid monochrome and color image sensor array having a first subset of monochrome pixels without color filter elements and a second subset of color pixels having color sensitive filter elements.

In the course of operation of apparatus 1000, image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 can be utilized.

Referring to further aspects of apparatus 1000, imaging lens assembly 200 can be adapted for focusing an image of a decodable indicia 15 located within a field of view 1240 on a substrate, T, onto image sensor array 1033. Imaging lens assembly 200 in combination with image sensor array 1033 can define a field of view 1240 on a substrate T.

Apparatus 1000 can include an illumination assembly 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination assembly 800 can include a light source bank 500, comprising one or more light sources. The apparatus 1000 may be configured so that the light from light source bank 500 is directed toward a field of view 1240. In one embodiment, illumination assembly 800 can include, in addition to light source bank 500, illumination light shaping optics 300, as is shown in the embodiment of FIG. 1. In light shaping optics 300 can include, e.g., one or more diffusers, mirrors and prisms. In use, apparatus 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIG. 1, decodable indicia 15 is provided by a 1D bar code symbol. Decodable indicia 15 could also be provided by a 2D bar code symbol or optical character recognition (OCR) characters.

In one embodiment light source bank 500 can project light in first narrow wavelength band. In one embodiment light source bank 500 can project light in a first narrow wavelength band and a second narrow wavelength band. In one embodiment light source bank 500 can project light in first narrow wavelength band, a second narrow wavelength band, and a third narrow wavelength band. In one embodiment, light source bank 500 can project light in N narrow wavelength bands wherein N is greater or equal to 1. In one embodiment, light source bank 500 includes one or more light source that emits "white" light that spans multiple visible wavelength bands. In one example, the one or more light source can be an LUW CP7P-KTLP-5E8G-35 light source of the type available from OSRAM Opto Semiconductors GmbH.

Figure 3:
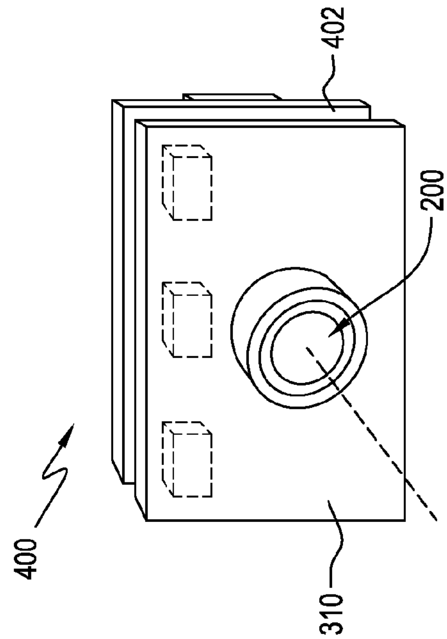
FIG. 3 is a perspective view of an imaging module, in accordance with an aspect of the invention.
Figure 2:
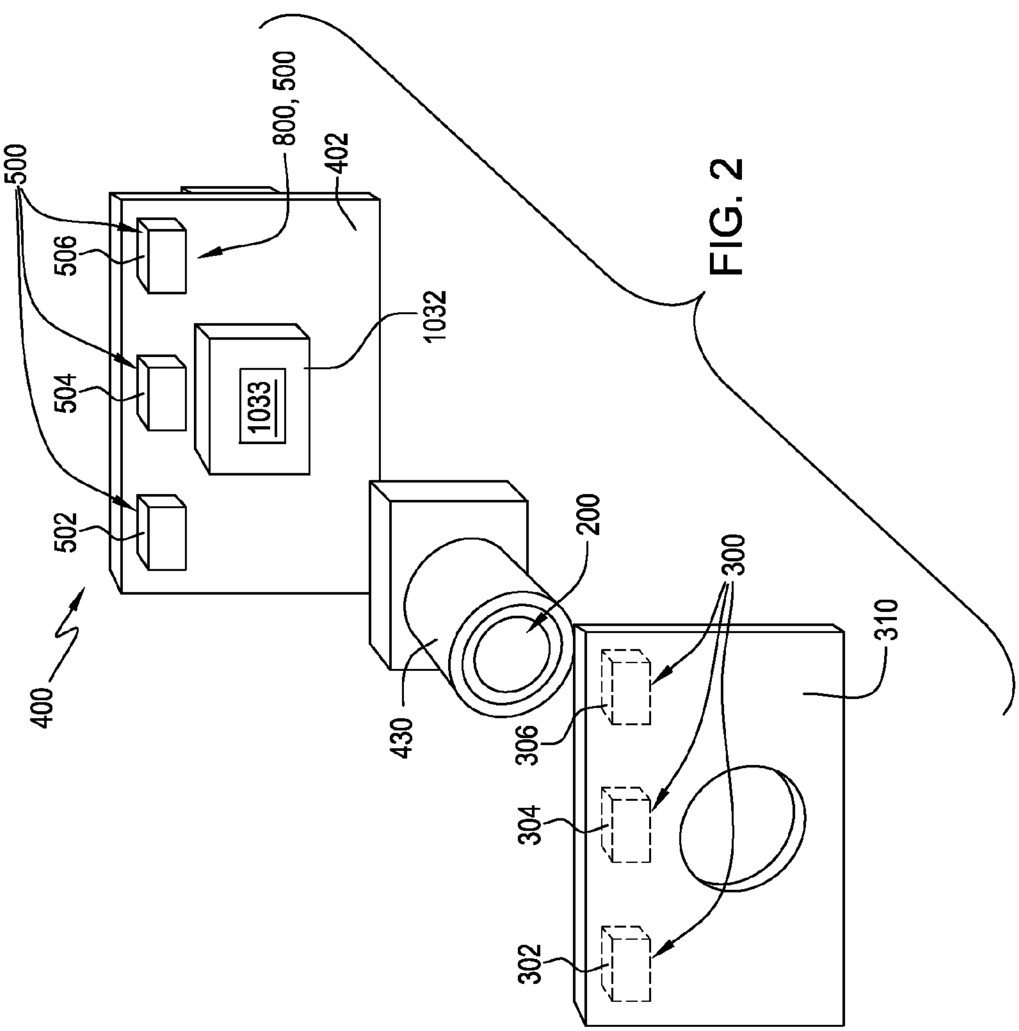
FIG. 2 is an exploded assembly perspective view of an imaging module, in accordance with an aspect of the invention.

A physical form view of an example of an illumination assembly is shown in FIGS. 2-3. As shown in FIGS. 2-3, an imaging module 400 can be provided having a circuit board 402 carrying image sensor 1032 and lens assembly 200 disposed in support 430 disposed on circuit board 402. In the embodiment of FIGS. 2 and 3, illumination assembly 800 has a light source bank 500 provided by first light source 502, second light source 504 and third light source 506. Each light source 502, 504, 506 can be provided e.g., by an LED. In one embodiment, each light source 502, 504, 506 can emit "white light," e.g., light that includes emissions spanning the blue, green and red wavelength bands. In one embodiment, each light source 502, 504, 506 can emit light in a different narrow wavelength band. In one embodiment first light source 502 can emit narrow band light in the red wavelength band, second light source 504 can emit narrow band light in the green wavelength band and third light source 506 can emit narrow band light in blue wavelength band. The light sources 502, 504, 506 can be simultaneously energized to emit white light. Whether illumination assembly 800 includes one or more white light sources or one or more narrow band light source illumination assembly 800 during an exposure period can simultaneously project on a target light within the blue wavelength band, the green wavelength band and the red wavelength band. Illumination assembly 800 can further include a light shaping optics optical element 302, 304, 306 associated with each light source 502, 504, 506. Light shaping elements 302, 304, 306 can define light shaping optics 300 of illumination assembly 800. Light shaping elements 302, 304, 306 can be formed on optical plate 310 forming part of imaging module 400.

Figure 4:
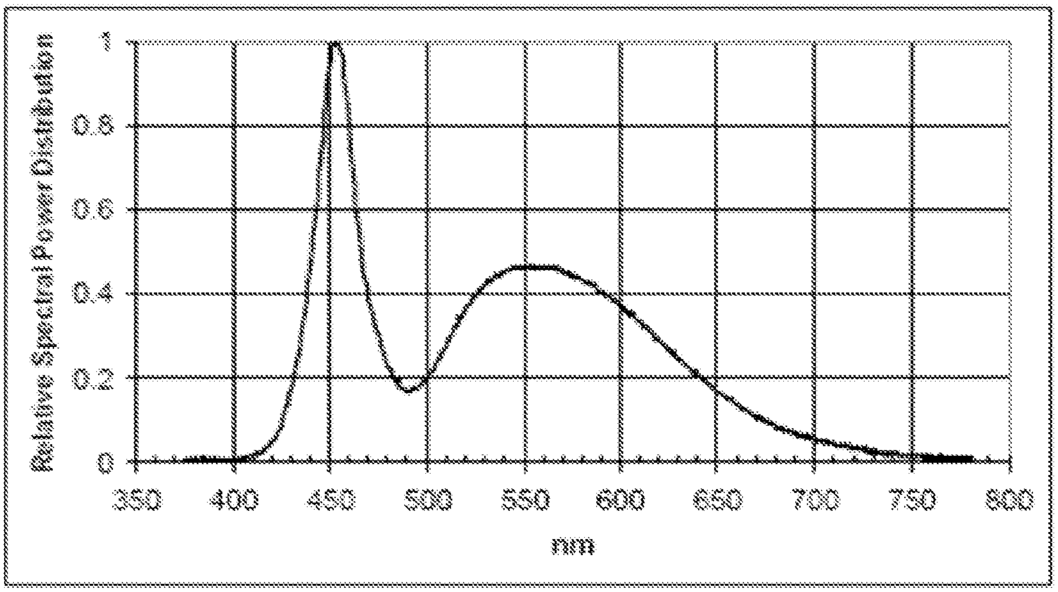
FIG. 4 is an emission profile of a "white light" light source that emits light spanning a range of visible color emission wavelength bands.

The apparatus 1000 can be adapted so that light from each of a one or more light source 502 of light source bank 500 e.g., light source 502, 504, 506 is directed toward field of view 1240 and utilized for projection of illumination pattern 1240. Each of the one or more light source 502, 504, 506 can include an emission profile as set forth in FIG. 4. Each light source, as indicated in FIG. 4, can emit light within the blue wavelength band, the green wavelength band, and the red wavelength band.

Figure 5:
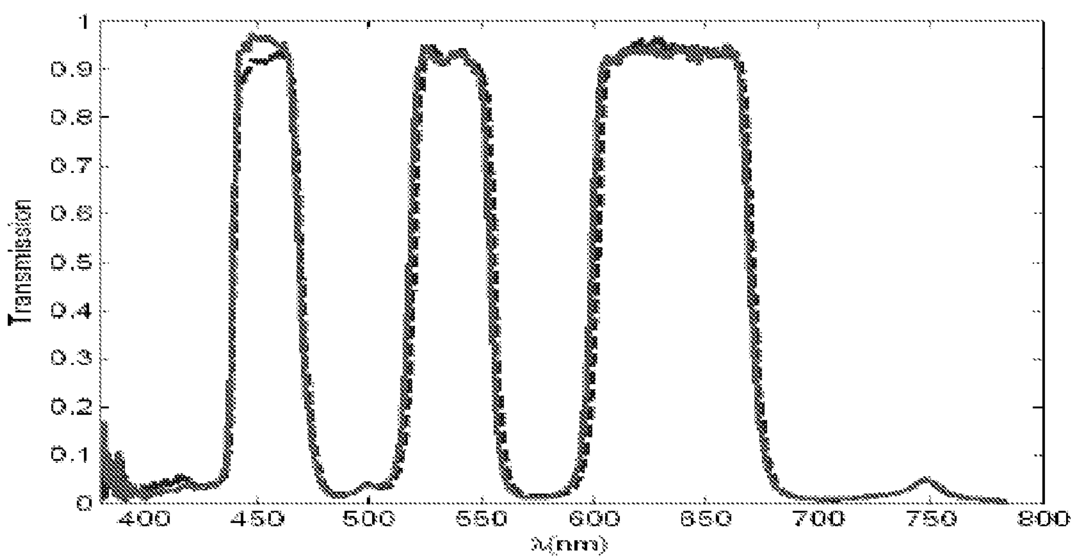
FIG. 5 is a pass band profile of an exemplary triple band pass filter that passes light in three separate transmission pass bands (one blue, one green, one red) in the visible color spectrum.

In another aspect apparatus 1000 can include band pass filter 250. In one embodiment, band pass filter 250 can be a triple band pass filter that selectively passes narrow band light within discrete narrow band wavelengths. In one embodiment, band pass filter 250 can have a transmission profile as set forth in FIG. 5 having a first pass band passing blue light, a second pass band passing green light and a third pass band passing red light. The filter as set forth in FIG. 5 can selectively transmit light within the blue wavelength band, can selectively transmit light within the green wavelength band and can selectively transmit light within the red wavelength band. In the embodiment as described with reference to FIG. 5, the pass bands can be separated, e.g., "gaps" in the pass bands can be present between about 480 nm and 515 nm and between about 560 nm and 590 nm. In the embodiment described with reference to FIG. 5, light at wavelengths shorter than the first pass band are blocked (attenuated). Light at wavelengths longer than the third pass band is also blocked (attenuated).

In another aspect, apparatus 1000 can include an aperture stop 270 defining an aperture 272. Aperture 272 can be a relative small aperture having an F# in the range of 8.0≤F#≤9.0. In one embodiment, an F# of aperture 272 is equal to or greater than 6.0. In one embodiment an F# of aperture 272 is equal to or greater than 7.0. In one embodiment, an F# of aperture 272 is equal to or greater than 8.0. An imaging system 900 of apparatus 1000 can include imaging lenses 200, aperture stop 270, band filter 230 and image sensor array 250.

Because of chromatic aberrations, best focus points for different wavelengths can diminish an optical performance of lens assembly 200 and can decrease a signal to noise ratio (SNR) imaging lenses 200 can be designed so that chromatic aberrations are reduced. In one embodiment, merit functions are defined to optimize wavefront aberrations to find a solution. In one embodiment, four configurations are established. Three narrow wave bands (R, G, B) are defined in three configurations, respectively. The primary wavelengths of three bands are defined in the fourth configuration. Merit functions are defined in these four configurations to seek the optimized solution for the three wave bands. An advantage of the solution is to provide improved optical performance (MTF, DOF) in three working spectrum bands. Another advantage is to maximize the SNR on the sensor with the triple bandpass applied in the lens system.

Further aspects of imaging lens 200 are now described. In one embodiment, imaging lens 200 can be a well corrected imaging lens well corrected for chromatic aberration.

Various approaches have been implemented for achieving chromatic correction. Imaging lenses having more than three elements have been proposed. Also, lens elements having aspherical surfaces have been proposed. Also, hybrid lenses have been proposed having more than one material type. Such approaches are advantageous in certain applications.

An example of a method for design of a particular well corrected lens is set forth in Example 1.

EXAMPLE 1

For design of an imaging lens, four configurations are defined. In configuration #1, wavelengths are defined as (0.440 um, 0.455 um, 0.470 um), which matches the blue band of the triple-band filter as described in connection with FIG. 5. In configuration #2, wavelengths are defined as (0.520 um, 0.540 um, 0.560 um) for matching the green band. In configuration #3, wavelengths are defined as (0.600 um, 0.650 um, 0.700 um) for matching the red band. In configuration #4, wavelengths are defined as (0.455 um, 0.540 um, 0.650 um), which are the center wavelengths of three narrow wavelength bands. Merit functions are then established in four configurations to seek the optimized solution for the three wave bands. According to the method set forth in Example 1, optical performance in three wavelength bands is improved to increase the signal to noise ratio (SNR) of a signal output by image sensor array 1033 implemented in apparatus 1000 having triple band pass filter 250. With the four configuration approach set forth in Example 1, first, second and third configurations are defined to match first, second and third narrow bands, a fourth configuration is defined by the respective center wavelengths of the three narrow bands, and merit functions are established in the four configurations to identify an optimized solution for the four configurations.

Figure 6:
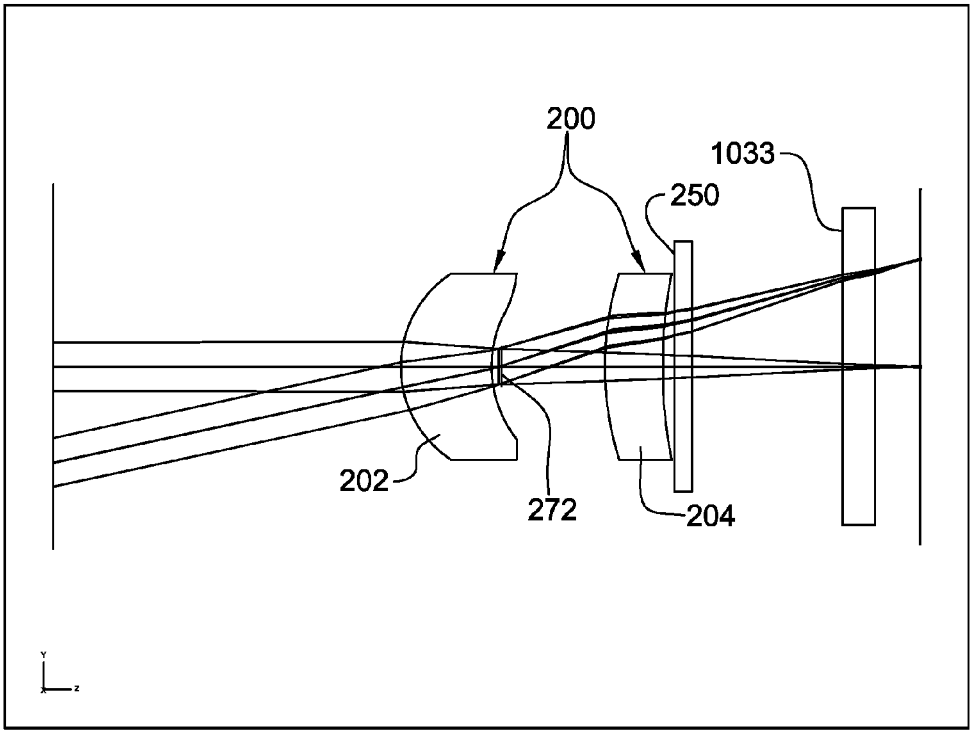
FIG. 6 is a diagram of an imaging system having an imaging lens designed according to a four configuration method.

Lens specifications of one embodiment in accordance with Example 1, are as follows:

Lens Specifications:

1. EFL: 8.4 mm
2. FOV: 12.2°×15.8°
3. Focus distance: 9.4"
4. Image size: 6.2 mm diagonal An imaging lens 200 in one embodiment in accordance with Example 1 is implemented as a two element glass lens as shown in FIG. 6. The two element glass lens as shown in FIG. 6 can have first lens element 202 and second lens element 204. Where imaging lens 200 is provided by a two element lens, imaging lens 200 is devoid of lens elements other than first and second lens elements. Lens specification and prescription data set forth herein are based on simultaneous utilizing ZEMAX optical design simulations software.

A prescription for imaging lens 200 in accordance with Example 1 is presented in Table 1.

TABLE 1

| Surface: | Type | Comment | Radius | Thickness | Glass | Semi-Diameter | Nd | Vd |
|---|---|---|---|---|---|---|---|---|
| OBJ | Standard | Object location | Infinity | 236.000 | | 85.340 | | |
| 1 | Standard | S1 of E1 | 1.909 | 1.560 | H-FK61 | 1.600 | 1.496998 | 81.5947 |
| 2 | Standard | S2 of E1 | 2.021 | 0.120 | | 1.250 | | |
| Stop 3 | Standard | Aperture | Infinity | 0.050 | | 0.308 | | |
| 4 | Standard | | Infinity | 1.780 | | 0.334 | | |
| 5 | Standard | S1 of E2 | 5.340 | 0.990 | H-ZLAF1 | 1.600 | 1.801663 | 44.2823 |
| 6 | Standard | S2 of E2 | 8.234 | 0.200 | | 1.600 | | |
| 7 | Standard | Filter | Infinity | 0.300 | SCHOTT_D263 | 2.150 | | |
| 8 | Standard | | Infinity | 2.600 | | 2.150 | | |
| 9 | Standard | Cover on Sensor | Infinity | 0.550 | SCHOTT_D263 | 2.578 | | |
| 10 | Standard | | Infinity | 0.780 | | 2.717 | | |
| 11 | Standard | Sensor location | Infinity | 0.000 | | 3.050 | | |

Nd is refractive index of glass;
Vd is V number of glass

Figure 7:
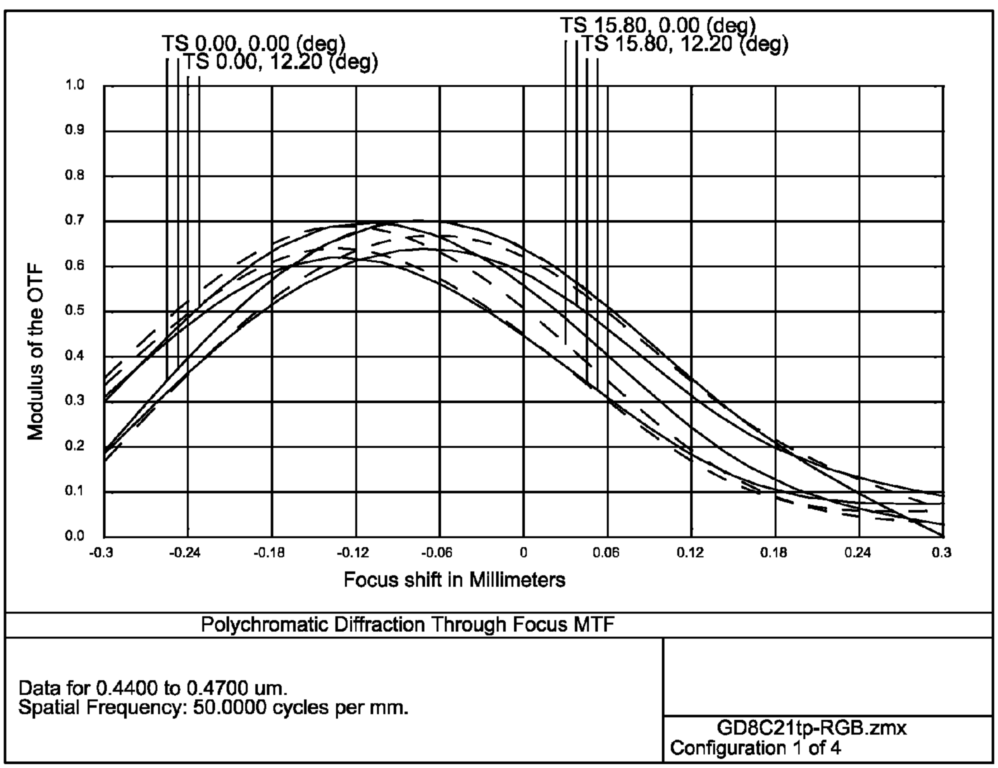
FIGS. 7-9 are through focus MTF plots in three wave bands illustrating characteristics of an imaging lens designed according to a four configuration method.
Figure 8:
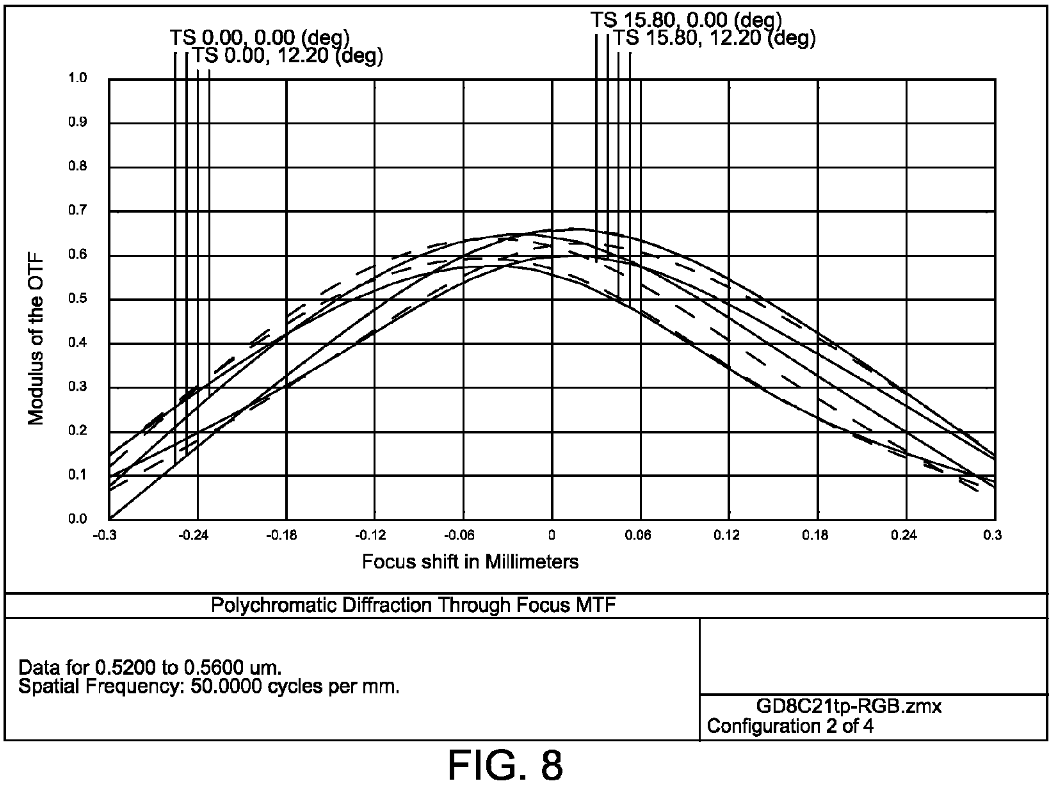
Figure 9:
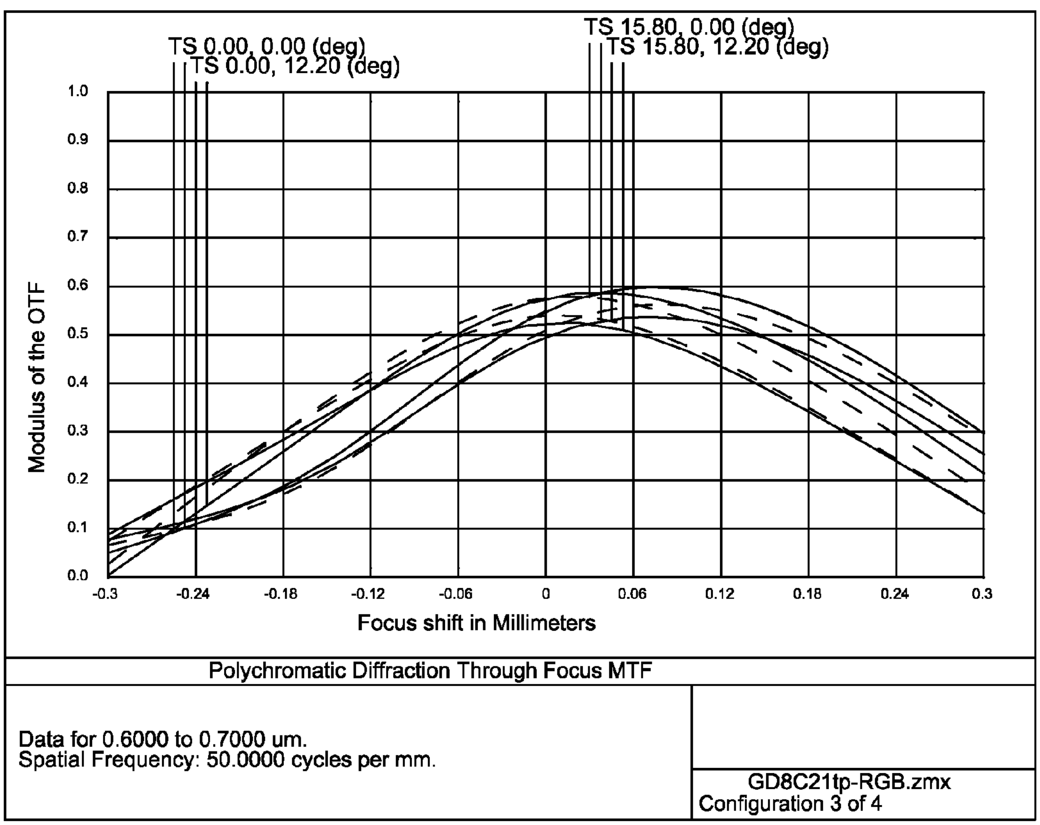

FIG. 7 (blue), FIG. 8 (green) and FIG. 9 (red) are through focus MTF plots in three wave bands. By the approach set forth herein, the best focus difference between blue and red light is 0.15 mm, and the ratio of chromatic aberration to effective focal length is 0.018. The chromatic aberration is much improved. Meanwhile, compared to a design having aspherical lens surfaces, the design in accordance with Example 1 alleviates performance degradation in an off-axis area.

Figure 10:
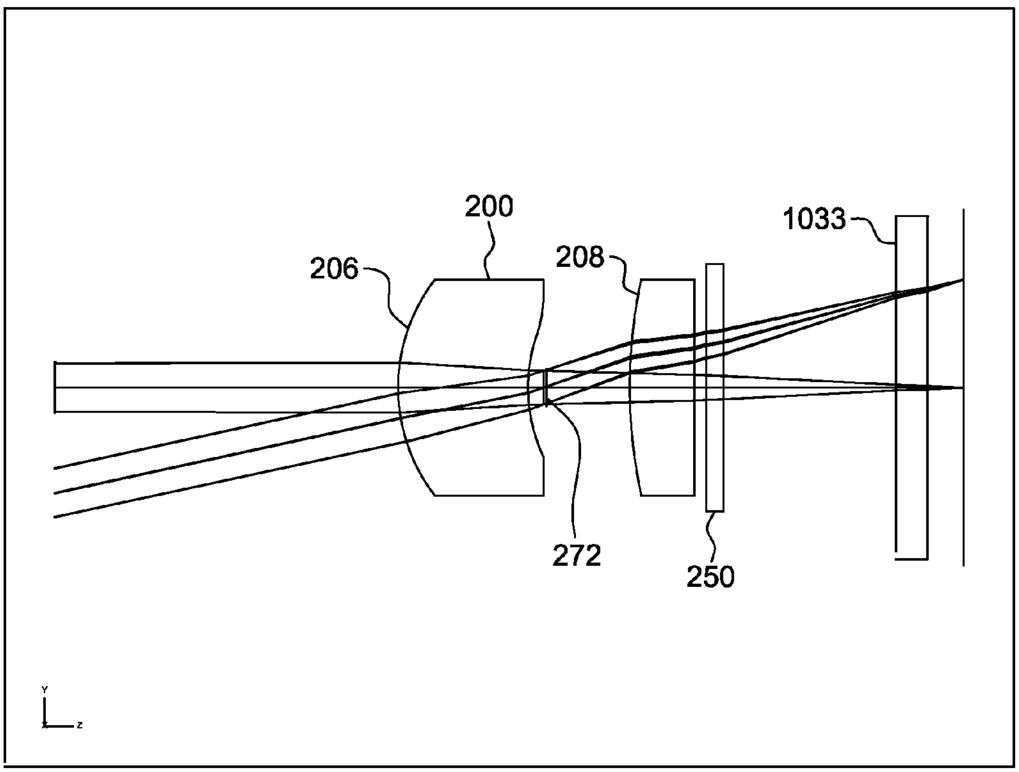
FIG. 10 is a diagram of a system having an imaging lens designed according to a single configuration method.

Results set forth by application of the four configuration method set forth with reference to Example 1 are compared to an alternative system in which a two element glass imaging lens design is provided by building merit functions in a single configuration and the optimization process is driven to search a local minimum point. An alternative lens design can be provided by defining visible wavelengths as (0.486 um, 0.587 um, 0.656 um), and a primary wavelength as 0.587 um (green light). Merit functions in a comparison alternative system can be built in one configuration and drive optimization process to search a local minimum point. More particularly, with a one configuration approach an imaging lens design is optimized for a single broad band configuration. With the one configuration approach, a configuration is defined to match a single broad band and merit functions are established in the broad band to identify an optimized solution for the one configuration. A resulting solution has the best focus for the primary wavelength (green light). Due to the chromatic aberration, the best focus points of red light and blue light are away from the green focus point. The blue light focus before the green light, and the red light focus after the green light. The amount of chromatic aberration can be measured by the separation of the best focus points of blue and red light. With a two elements system designed by the single configuration approach, the focus difference of blue light and red light is 0.23 mm. The ratio of chromatic aberration to effective focal length is 0.027. A diagram of a two element glass imaging lens having first lens element 206 and second lens element 208 designed according to a one configuration approach is shown in FIG. 10. Imaging lens 200 as shown in FIG. 10 has a first glass lens element 202 and a second glass lens element 204. A prescription for a comparison two element glass design using the single configuration approach is set forth in Table 2.

of increased curvature, a first lens element having a reduced index of refraction and increased V number, and a second lens element having a reduced index of refraction and increased V number. There is set forth herein a method for reducing chromatic aberrations of an imaging lens having first and second lens elements, the method comprising two or more of (a) through (h); (a) increasing a curvature of a light entry; (b) increasing a curvature of a light exit surface of the first lens element; (c) increasing a curvature of a light entry surface of the second lens element; (d) increasing a curvature of a light exit surface of the second lens element; (e) decreasing an index of refraction of the first lens element; (f) decreasing an index of refraction of the second lens element; (g) increasing a V number of the first lens element; (h) increasing a V number of the second lens element.

By comparison as set forth herein, a two element glass lens provided in accordance with the method of Example 1 has a focus difference of blue light and red light of 0.15 mm and a ratio of chromatic aberration of 0.018. In one embodiment, an imaging lens can have a ratio of chromatic aberration to effective focal length of less than 0.025. In one embodiment, an imaging lens can have a ratio of chromatic aberration to effective focal length of less than 0.024. In one embodiment, an imaging lens can have a ratio of chromatic aberration to effective focal length of less than 0.023. In one embodiment, an imaging lens can have a ratio of chromatic aberration to effective focal length of less than 0.022. In one embodiment, an imaging lens can have a ratio of chromatic aberration to effective focal length of less than 0.021. In one embodiment, an imaging lens can have a ratio of chromatic aberration to effective focal length of less than 0.020.

In one aspect of the imaging lens 200 as set forth in FIG. 6 each lens surface of first lens element 202 and second lens element 204 are spherical. By making each lens surface spherical, cost is reduced and performance degradation in off-axis areas can be reduced. The selection of glass (as opposed to polymer based materials) can optimize performance for the reason that glass elements are available in a wider range of refractive indices and V numbers, and/or can

TABLE 2

| Surface: Type | | Comment | Radius | Thickness | Glass | Semi-Diameter | Nd | Vd |
|---|---|---|---|---|---|---|---|---|
| OBJ | Standard | Object location | Infinity | 236.000 | | 85.628 | | |
| 1 | Standard | S1 of E1 | 3.078 | 2.260 | H-LAK53A | 1.875 | 1.755002 | 52.3293 |
| 2 | Standard | S2 of E1 | 2.849 | 0.270 | | 1.200 | | |
| Stop 3 | Standard | Aperture | Infinity | 0.050 | | 0.292 | | |
| 4 | Standard | | Infinity | 1.450 | | 0.323 | | |
| 5 | Standard | S1 of E2 | 8.867 | 1.130 | H-ZLAF3 | 1.875 | 1.855449 | 36.5981 |
| 6 | Standard | S2 of E2 | Infinity | 0.200 | | 1.875 | | |
| 7 | Standard | Filter | Infinity | 0.300 | BK7 | 2.150 | | |
| 8 | Standard | | Infinity | 3.000 | | 2.150 | | |
| 9 | Standard | Cover on Sensor | Infinity | 0.550 | BK7 | 2.840 | | |
| 10 | Standard | | Infinity | 0.629 | | 2.980 | | |
| 11 | Standard | Sensor location | Infinity | 0.000 | | 3.090 | | |

Nd is refractive index of glass;
Vd is V number of glass

Figure 11:
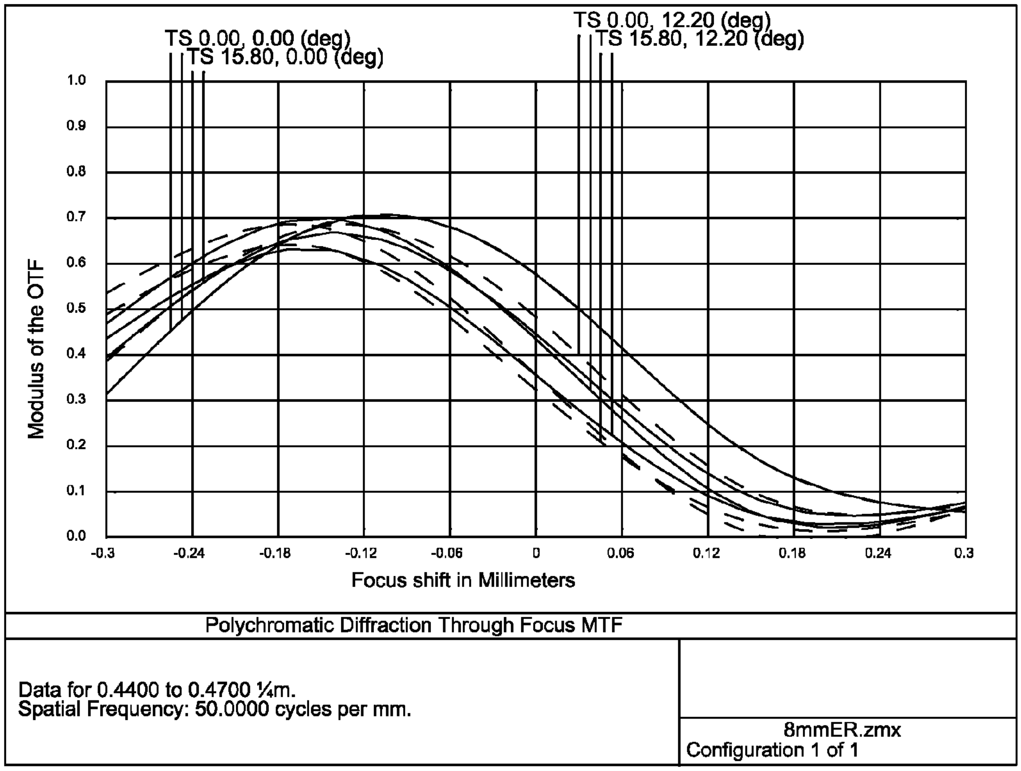
FIGS. 11-13 are through focus MTF plots in three wavelength bands in an imaging lens designed according to a single configuration method.
Figure 12:
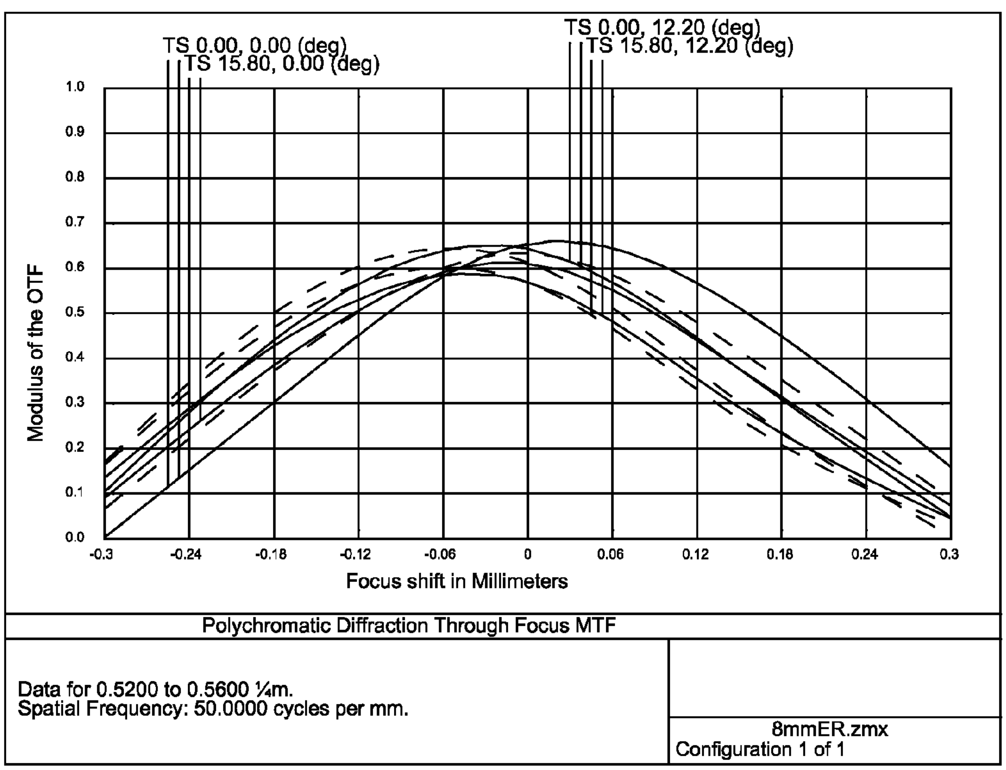
Figure 13:
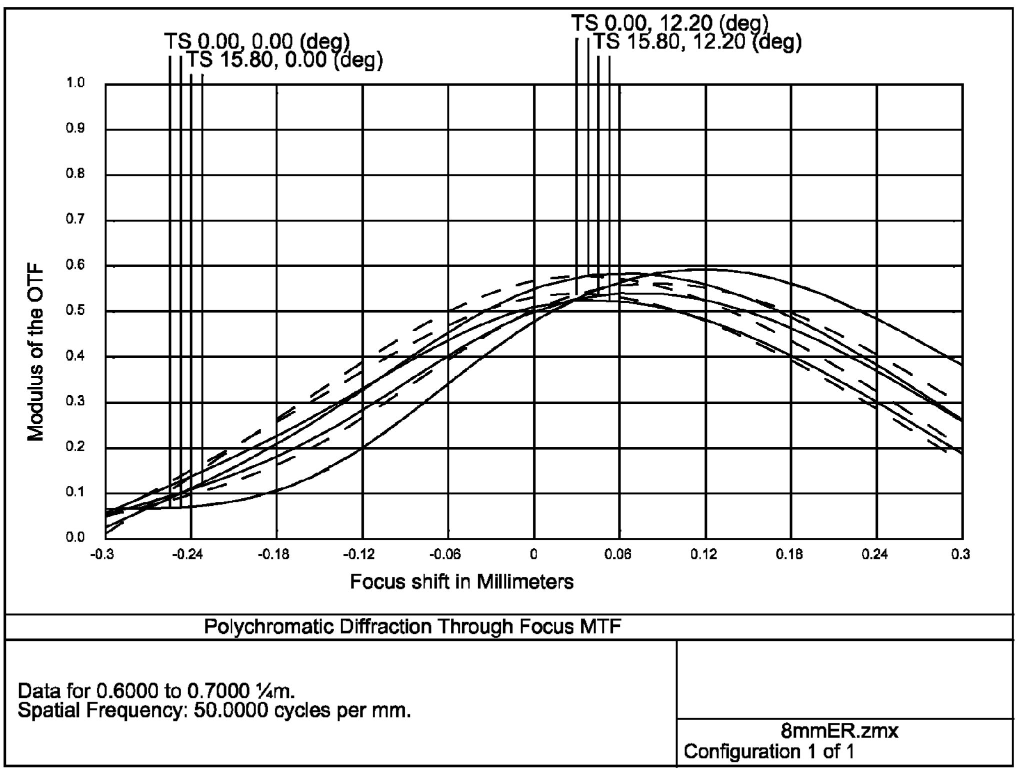

MTF plots in three bands for an imaging lens designed according to the signal configuration approach are set forth in FIG. 11 (blue), FIG. 12 (green) and FIG. 13 (red). By comparison of Table 2 and Table 1 it is seen that an imaging lens designed according to the four configuration design approach as compared to imaging lens designed according to the one configuration design approach features a first lens element including light entry and exit surfaces of increased curvature, a second lens element including light entry and exit surfaces be fabricated accorded to specification more precisely to a certain index of refraction or V number. In some applications polymer based lens materials are preferred. With a design as set forth herein, excellent chromatic aberration correction can be achieved with a two element design which in one embodiment can be a two element glass imaging lens. The design set forth herein facilitates use of a two element glass lens in an imaging apparatus having an image sensor array with color sensitive pixels.

Referring to further aspects of apparatus 1000, light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination assembly 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated in an integrated circuit 2060 disposed on circuit board 402 (shown in FIGS. 2 and 3).

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Apparatus 1000 can also include a keyboard 1226 coupled to system bus 1500 via interface 1126. Various interface circuits of apparatus 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination assembly controls. Apparatus 1000 may include a network communication interface 1252 coupled to system bus 1500 and in communication with CPU 1060, via interface 1152. Network communication interface 1252 may be configured to communicate with an external computer through a network.

A succession of frames of image data that can be captured and subject to the described processing can be full frames (including pixel values corresponding to each pixel of image sensor array 1033 or a maximum number of pixels read out from image sensor array 1033 during operation of apparatus 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 1000 can be increased (and frame time decreased) by decreasing of a frame picture size.

Figure 14:
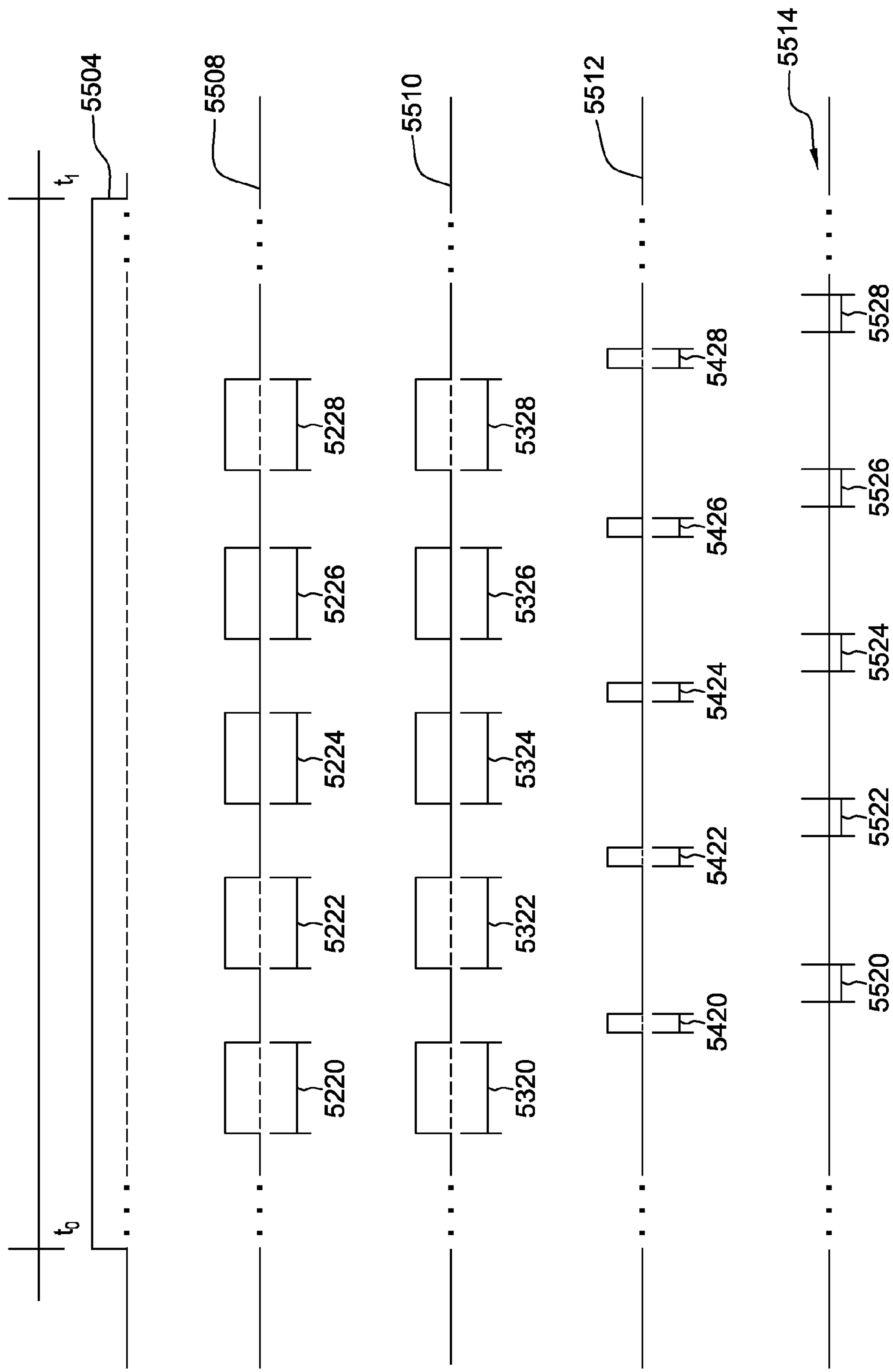
FIG. 14 is a timing diagram illustrating operation of an imaging apparatus.

Referring to the timing diagram of FIG. 14, signal 5504 is a trigger signal which can be made active by actuation of trigger 1220, and which can be deactivated by releasing of trigger 1220. A trigger signal can also become inactive after a time out period or after a successful decode of a decodable indicia. Signal 5510 is a frame exposure signal. Logic high periods of signal 5510 define frame exposure periods 5320, 5322, 5324, 5326, 5328. Signal 5512 is a read out signal. Logic high periods of signal 5512 define read out periods 5420, 5422, 5424, 5426, 5428. Processing periods 5520, 5522, 5524, 5526, 5528 can represent processing periods during which time CPU 1060 of imaging apparatus 1000 processes stored (e.g., buffered) frames representing a substrate that can bear decodable indicia. Such processing can include processing for attempting to decode a decodable indicia as described herein.

With further reference to the timing diagram of FIG. 14, an operator at time, $t_0$, can activate trigger signal 5504 (e.g., by depression of trigger 1120). In response to trigger signal 5504 being activated, apparatus 1000 can expose a succession of frames. During each frame exposure period 5320, 5322, 5324, 5326, 5238 a frame of image data can be exposed.

Referring further to the timing diagram of FIG. 14, signal 5508 is a light pattern control signal. Logic high periods of signal 5508, namely periods 5220, 5222, 5224, 5226, 5228 define "on" periods for projected illumination pattern 1260. A light source bank 500 of illumination assembly 8000 can be energized to project illumination pattern 1260 during illumination periods 5220, 5222, 5224 that overlap frame exposure periods 5320, 5322, 5324 so that at least a portion of an illumination period occurs during an associated frame exposure period and further that a portion of a frame exposure period occurs during an associated illumination period. At time $t_1$, trigger signal 5504 can be deactivated e.g., responsively to a successful decode, a timeout condition being satisfied, or a release of trigger 1120. Regarding illumination periods 5220, 5222, 5224, 5226, 5228, the illustrated on times in one embodiment can be "continuously on" on times. The illustrated on times in another embodiment can be strobed on times wherein light source bank 1204 is turned on and off rapidly during an illumination period. In one embodiment, two of light sources 502, 504, 506 are simultaneously energized during each illumination period 5220, 5222, 5224, 5226, 5228. In another embodiment, three of light sources 502, 504, 506 are simultaneously energized during illumination periods 5220, 5222, 5224.

Figure 15:
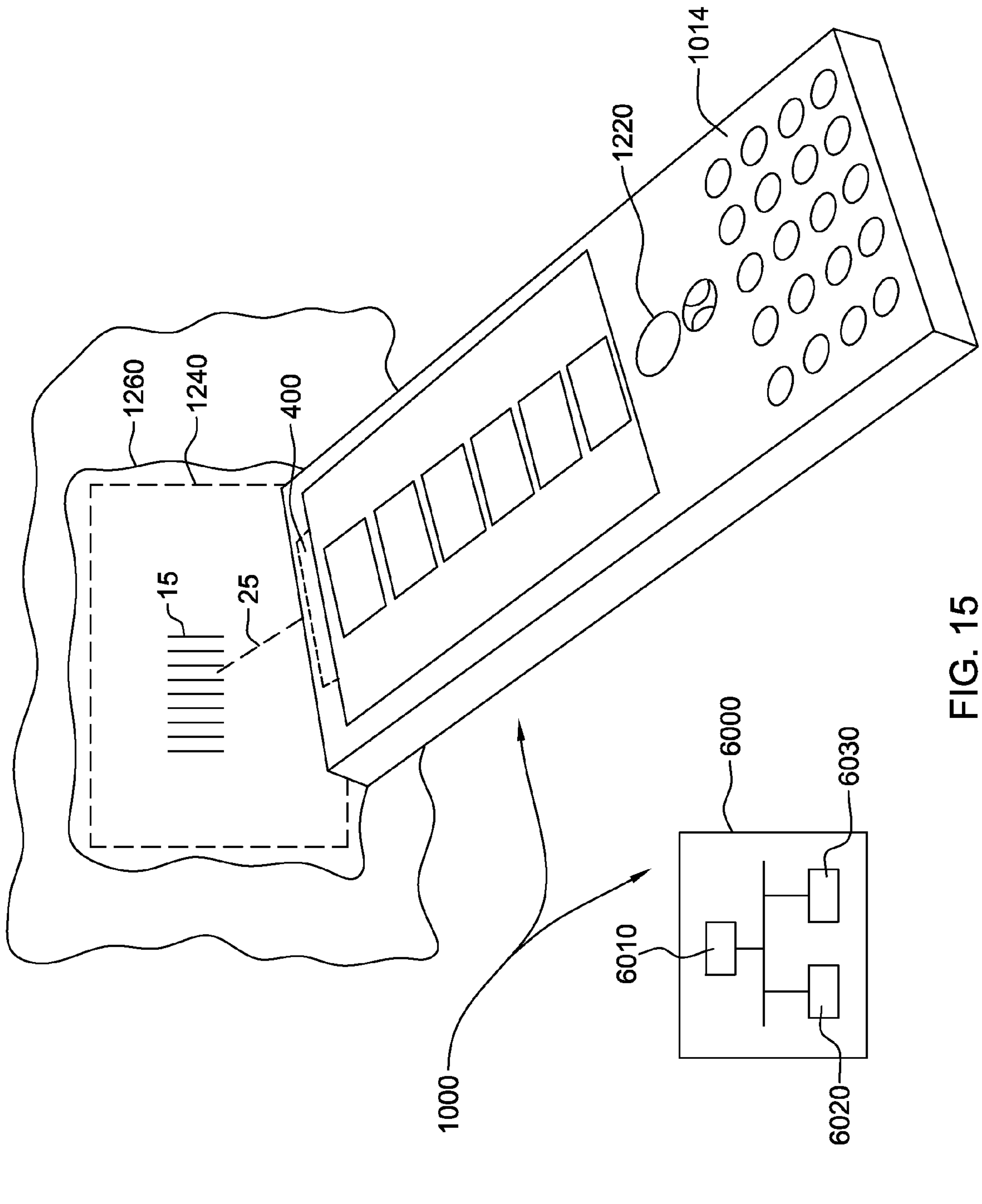
FIG. 15 is a physical form view of an imaging apparatus.

Referring Now to FIG. 15, an example apparatus 1000 is shown. Specifically, apparatus 1000 can have a housing 1014, which as shown in FIG. 15, may be a hand held housing. Housing 1014 is configured to encapsulate image sensor integrated circuit 1040 (shown in FIG. 15). A microprocessor integrated circuit 1060 having a CPU for attempting to decode decodable indicia can be disposed on circuit board 402 (shown in FIG. 15). Such microprocessor integrated circuit 1060 can be disposed externally to circuit board 402, for example, on a circuit board external to circuit board 402 within housing 1014. In one embodiment, apparatus 1000 can include CPU 1060, memory 1085, and network communication interface 1252 comprising a first computer housed within housing 1014 (shown as a dashed border in FIG. 1), and a second computer 6000 external to housing 1014, having a CPU 6010, memory 6020 and a network communication interface 6030. Image data can be transmitted to the second computer 6000 for processing by the CPU 6010 for attempting to decode decodable indicia. Where second computer 6000 is not utilized for a referenced processing, apparatus 1000 can be regarded as being provided by the first apparatus.

A small sample of systems methods and apparatus that are described herein is as follows:

A1 An imaging apparatus comprising: an imaging assembly including an imaging lens and an image sensor array, the imaging assembly defining a field of view, the image sensor array having a plurality a pixels, the plurality of pixels including color sensitive pixels having wavelength selective color filter elements; an illumination assembly that, during a frame exposure period of the imaging assembly simultaneously projects on a target light within the blue wavelength band, the green wavelength band and the red wavelength band; wherein the imaging lens is a two element glass imaging lens, the imaging lens having a first glass lens element and a second glass element; wherein the imaging apparatus captures a frame of image data representing light incident of the image sensor array during an exposure period; and wherein the imaging apparatus includes a pass band filter that selectively passes light within first second and third pass bands, the first pass band being defined in the blue wavelength band, the second pass band being defined in the green wavelength band, the third pass band being defined in the red wavelength band; wherein the imaging apparatus processes the frame of image data for attempting to decode decodable indicia. A2. The imaging apparatus of claim A1,wherein the first pass band is separated from the second pass band and wherein the second pass band is separated from the third pass band. A3. The imaging apparatus of claim A1,wherein the imaging lens has a chromatic aberration to effective focal length ratio of less than 0.0025. A4. The imaging apparatus of claim A1,wherein the imaging lens has a chromatic aberration to effective focal length ratio of less than 0.0020. A5. The imaging apparatus of claim A1, wherein the illumination assembly comprises a single light source. A6. The imaging apparatus of claim A1,wherein the illumination assembly includes a white light source emitting light that spans multiple visible color wavelength bands. A7. The imaging apparatus of claim A1, wherein the imaging lens includes a chromatic aberration of less than would be exhibited by the imaging lens if the imaging lens were optimized in a single broad band configuration. A8. The imaging apparatus of claim A1,wherein the first lens element has a light entry surface curvature greater than a light entry surface curvature that would be exhibited by the first lens element if the imaging lens were optimized in a single broad band configuration. A9. The imaging apparatus of claim A1,wherein the first lens element has a light entry surface curvature greater than a light entry surface curvature that would be exhibited by the first lens element if the imaging lens were optimized in a single broad band configuration. A10. The imaging apparatus of claim A1, wherein the first lens element has a light entry surface curvature greater than a light entry surface curvature that would be exhibited by the first lens element if the imaging lens were optimized in a single broad band configuration. A11. The imaging apparatus of claim A1,wherein the second lens element has a light entry surface curvature greater than a light entry surface curvature that would be exhibited by the second lens element if the imaging lens were optimized in a single broad band configuration. A12. The imaging apparatus of claim A1,wherein the first and second lens elements have indices of refraction reduced relative to indices of refraction that would be exhibited by the first and second lens elements if the imaging lens were optimized in a single broad band configuration. A13. The imaging apparatus of claim A1,wherein the first and second lens elements have V numbers increased relative to V numbers that would be exhibited by the first and second lens elements if the imaging lens were optimized in a single broad band configuration. A14. The imaging apparatus of claim A1,wherein the first lens element and the second lens element are devoid of aspherical light entry and light exit lens surfaces. A15. The imaging apparatus of claim A1,wherein the imaging apparatus includes a hand held housing in which the image sensor array is disposed.

B1. A method comprising: defining first second and third configurations, wherein the first second and third configurations are defined to match first second and third pass bands of a multiple pass band filter; defining a fourth configuration having first second and third wavelengths, respectively, within the first second and third pass bands; providing an imaging lens by establishing merit functions within the four configurations to seek an optimized solution for the first, second and third pass bands. B2. The method of claim B1, wherein the method includes incorporating the imaging lens into an imaging apparatus having the multiple pass band filter. B3. The method of claim B1, wherein the method includes incorporating the imaging lens into an imaging apparatus having an image sensor array including color sensitive pixels and indicia decoding capability.

C1. A method for reducing chromatic aberrations of an imaging lens having first and second lens elements, the method comprising two or more of (a) through (h); (a) increasing a curvature of a light entry; (b) increasing a curvature of a light exit surface of the first lens element; (c) increasing a curvature of a light entry surface of the second lens element; (d) increasing a curvature of a light exit surface of the second lens element; (e) decreasing an index of refraction of the first lens element; (f) decreasing an index of refraction of the second lens element; (g) increasing a V number of the first lens element; (h) increasing a V number of the second lens element. C2. The method of claim C1, wherein the method includes performing three or more of (a) through (h); (a) increasing a curvature of a light entry; (b) increasing a curvature of a light exit surface of the first lens element; (c) increasing a curvature of a light entry surface of the second lens element; (d) increasing a curvature of a light exit surface of the second lens element; (e) decreasing an index of refraction of the first lens element; (f) decreasing an index of refraction of the second lens element; (g) increasing a V number of the first lens element; (h) increasing a V number of the second lens element. C3. The method of claim C1, wherein the method includes performing each of (a) through (h); (a) increasing a curvature of a light entry; (b) increasing a curvature of a light exit surface of the first lens element; (c) increasing a curvature of a light entry surface of the second lens element; (d) increasing a curvature of a light exit surface of the second lens element; (e) decreasing an index of refraction of the first lens element; (f) decreasing an index of refraction of the second lens element; (g) increasing a V number of the first lens element; (h) increasing a V number of the second lens element.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An imaging apparatus comprising:

an imaging assembly including an imaging lens and an image sensor array, the imaging assembly defining a field of view, the image sensor array having a plurality a pixels, the plurality of pixels including color sensitive pixels having wavelength selective color filter elements;

an illumination assembly that, during a frame exposure period of the imaging assembly simultaneously projects on a target light within the blue wavelength band, the green wavelength band and the red wavelength band;

wherein the imaging lens is a two element glass imaging lens, the imaging lens having a first glass lens element and a second glass element;

wherein the imaging apparatus captures a frame of image data representing light incident of the image sensor array during an exposure period; and wherein the imaging apparatus includes a pass band filter that selectively passes light within first second and third pass bands, the first pass band being defined in the blue wavelength band, the second pass band being defined in the green wavelength band, the third pass band being defined in the red wavelength band;

wherein the imaging apparatus processes the frame of image data for attempting to decode decodable; and wherein the imaging lens has a chromatic aberration to effective focal length ratio of less than 0.025.

2. The imaging apparatus of claim 1, wherein the first pass band is separated from the second pass band and wherein the second pass band is separated from the third pass band.

3. The imaging apparatus of claim 1, wherein the imaging apparatus includes a hand held housing in which the image sensor array is disposed.

4. The imaging apparatus of claim 1, wherein the imaging lens has a chromatic aberration to effective focal length ratio of less than 0.020.

5. The imaging apparatus of claim 1, wherein the illumination assembly comprises a single light source.

6. The imaging apparatus of claim 1, wherein the illumination assembly includes a white light source emitting light that spans multiple visible color wavelength bands.

7. The imaging apparatus of claim 1, wherein the imaging lens includes a chromatic aberration of less than would be exhibited by the imaging lens if the imaging lens were optimized in a single broad band configuration.

8. The imaging apparatus of claim 1, wherein the first lens element has a light entry surface curvature greater than a light entry surface curvature that would be exhibited by the first lens element if the imaging lens were optimized in a single broad band configuration.

9. The imaging apparatus of claim 1, wherein the first lens element has a light entry surface curvature greater than a light entry surface curvature that would be exhibited by the first lens element if the imaging lens were optimized in a single broad band configuration.

10. The imaging apparatus of claim 1, wherein the first lens element has a light entry surface curvature greater than a light entry surface curvature that would be exhibited by the first lens element if the imaging lens were optimized in a single broad band configuration.

11. The imaging apparatus of claim 1, wherein the second lens element has a light entry surface curvature greater than a light entry surface curvature that would be exhibited by the second lens element if the imaging lens were optimized in a single broad band configuration.

12. The imaging apparatus of claim 1, wherein the first and second lens elements have indices of refraction reduced relative to indices of refraction that would be exhibited by the first and second lens elements if the imaging lens were optimized in a single broad band configuration.

13. The imaging apparatus of claim 1, wherein the first and second lens elements have V numbers increased relative to V numbers that would be exhibited by the first and second lens elements if the imaging lens were optimized in a single broad band configuration.

14. The imaging apparatus of claim 1, wherein the first lens element and the second lens element are devoid of aspherical light entry and light exit lens surfaces.

15. A method comprising:

defining first second and third configurations, wherein the first second and third configurations are defined to match first second and third pass bands of a multiple pass band filter;

defining a fourth configuration having first second and third wavelengths, respectively, within the first second and third pass bands;

providing an imaging lens by establishing merit functions within the four configurations to seek an optimized solution for the first, second and third pass bands;

wherein the imaging lens has a chromatic aberration to effective focal length ratio of less than 0.025.

16. The method of claim 15, wherein the method includes incorporating the imaging lens into an imaging apparatus having the multiple pass band filter.

17. The method of claim 15, wherein the method includes incorporating the imaging lens into an imaging apparatus having an image sensor array including color sensitive pixels and indicia decoding capability.

18. A method for reducing chromatic aberrations of an imaging lens having first and second lens elements and a chromatic aberration to effective focal length ratio of less than 0.025, the method comprising two or more of (a) through (h);

(a) increasing a curvature of a light entry;

(b) increasing a curvature of a light exit surface of the first lens element;

(c) increasing a curvature of a light entry surface of the second lens element;

(d) increasing a curvature of a light exit surface of the second lens element;

(e) decreasing an index of refraction of the first lens element;

(f) decreasing an index of refraction of the second lens element;

(g) increasing a V number of the first lens element;

(h) increasing a V number of the second lens element.

19. The method of claim 18, wherein the method includes performing three or more of (a) through (h);

(a) increasing a curvature of a light entry;

(b) increasing a curvature of a light exit surface of the first lens element;

(c) increasing a curvature of a light entry surface of the second lens element;

(d) increasing a curvature of a light exit surface of the second lens element;

(e) decreasing an index of refraction of the first lens element;

(f) decreasing an index of refraction of the second lens element;

(g) increasing a V number of the first lens element;

(h) increasing a V number of the second lens element.

20. The method of claim 18, wherein the method includes performing each of (a) through (h);

(a) increasing a curvature of a light entry;

(b) increasing a curvature of a light exit surface of the first lens element;

(c) increasing a curvature of a light entry surface of the second lens element;

(d) increasing a curvature of a light exit surface of the second lens element;

(e) decreasing an index of refraction of the first lens element;

(f) decreasing an index of refraction of the second lens element;

(g) increasing a V number of the first lens element;

(h) increasing a V number of the second lens element.

* * * * *